(12) United States Patent
Reid et al.

(10) Patent No.: US 12,489,108 B2
(45) Date of Patent: Dec. 2, 2025

(54) ELECTROCHEMICAL METHODS AND MATERIALS

(71) Applicant: QinetiQ Limited, Farnborough (GB)

(72) Inventors: Max William Angus Reid, Chelmsford (GB); Charles John Michael Footer, Farnborough (GB)

(73) Assignee: QINETIQ LIMITED, Hampshire (GB)

( * ) Notice: Subject to any disclaimer, the term of this patent is extended or adjusted under 35 U.S.C. 154(b) by 226 days.

(21) Appl. No.: 18/265,930

(22) PCT Filed: Nov. 29, 2021

(86) PCT No.: PCT/EP2021/083392
§ 371 (c)(1),
(2) Date: Jun. 7, 2023

(87) PCT Pub. No.: WO2022/122453
PCT Pub. Date: Jun. 16, 2022

(65) Prior Publication Data
US 2024/0105920 A1    Mar. 28, 2024

(30) Foreign Application Priority Data

Dec. 11, 2020    (GB) ...................................... 2019623

(51) Int. Cl.
*H01M 4/36* (2006.01)
*C23C 14/12* (2006.01)
(Continued)

(52) U.S. Cl.
CPC .............. *H01M 4/366* (2013.01); *C23C 14/12* (2013.01); *C23C 14/34* (2013.01);
(Continued)

(58) Field of Classification Search
CPC ................................ H01M 4/366; H01M 4/00
See application file for complete search history.

(56) References Cited

U.S. PATENT DOCUMENTS

| 6,599,408 B1 | 7/2003 | Chan et al. |
| 2005/0036020 A1 | 2/2005 | Li et al. |

(Continued)

FOREIGN PATENT DOCUMENTS

| EP | 0899748 | 3/1999 | |
| JP | 2015046306 A | * 3/2015 | ............. C01G 53/42 |

(Continued)

OTHER PUBLICATIONS

Intellectual Property Office, Search Report mailed on Jun. 1, 2021, issued in connection with Great Britian Patent Application No. 2019623.4, 4 pages.

(Continued)

*Primary Examiner* — Cachet I Proctor
(74) *Attorney, Agent, or Firm* — McDonnell Boehnen Hulbert & Berghoff LLP (57) ABSTRACT

A method of forming a precursor substance for forming an electrode of an electrochemical cell. The method comprises providing particles of an electrode-forming material and coating the particles with an inert material to form coated particles. The inert material is inert with respect to the electrode-forming material. The coated particles are mixed with a liquid or gel carrier medium to form the precursor substance. Useful new electrochemical products are provided.

14 Claims, 7 Drawing Sheets

(51) Int. Cl.
*C23C 14/34* (2006.01)
*H01M 4/04* (2006.01)
*H01M 4/38* (2006.01)
*H01M 4/62* (2006.01)
*H01M 4/02* (2006.01)

(52) U.S. Cl.
CPC ....... *H01M 4/0404* (2013.01); *H01M 4/0426* (2013.01); *H01M 4/38* (2013.01); *H01M 4/628* (2013.01); *H01M 2004/027* (2013.01)

(56) References Cited

U.S. PATENT DOCUMENTS

2015/0104718 A1* 4/2015 Chen ............... H01M 12/06 429/403
2016/0087263 A1* 3/2016 Gadkaree ............ B22F 1/102 429/231.95

FOREIGN PATENT DOCUMENTS

| KR | 20180045010 A | * | 5/2018 |
| KR | 102159812 | | 9/2020 |
| KR | 102159812 B1 | * | 9/2020 |
| WO | 02/057766 | | 7/2002 |
| WO | 03/054070 | | 7/2003 |

OTHER PUBLICATIONS

"Polydimethysiloxane", Metals and arsenic specifications revised at the 61st JECFA, published in FNP 52, 1992, 5 pages.
Sarmento et al., "Corrosion protection of stainless steel by polysiloxane hybrid coatings prepared using the sol-gel process," Surface & Coatings Technology, 2010, pp. 2869-2701, No. 204.
Underhill et al., Oil-Filled Silica Nanocapsules for Lipophilic Drug Uptake: Implications for Drug Detoxification Therapy, Chem. Mater., 2022, pp. 4919-4925, No. 14.
International Searching Authority, International Search Report and Written Opinion mailed on Jul. 14, 2022, issued in connection with International Patent Application No. PCT/EP2021/083392, filed Nov. 29, 2021, 9 pages.

* cited by examiner

ELECTROCHEMICAL METHODS AND MATERIALS

The present application is a national stage entry of PCT/EP2021/083392 filed on Nov. 29, 2021, which claims priority to Great Britain Patent Application No. 2019623.4 filed Dec. 11, 2020, the contents of each of which are hereby incorporated by reference.

TECHNICAL FIELD

The invention relates to a method of forming an electrode for an electrochemical cell. In particular, the invention relates to a method of forming an electrode for an electrochemical cell from a precursor substance. The invention also relates to a method of making a precursor substance and to the precursor substance. Useful new electrochemical materials and products are also provided.

BACKGROUND

Modern life has come to depend on all kinds of consumer electrochemical cells: from batteries to fuel cells, supercapacitors and beyond. The applications of these cells have evolved over the decades to meet the needs of developing technologies.

Anodes for such electrochemical cells are typically made from reactive metals such as zinc or lithium. Indeed, it is the reactivity of these metals that allow such an electrode to serve as an anode in an electrochemical cell.

Unhelpfully, because of their reactivity the metals used for anodes are easily oxidisable in ambient conditions. As a result, the handling of these metals and the manufacture of anodes therefrom can be complicated and expensive due to the care and speed required when handling reactive metals.

The methods and materials according to the present invention aim to solve or at least alleviate one or more of the problems associated with the prior art.

SUMMARY OF THE INVENTION

The present invention provides a method of forming a precursor substance for forming an electrode of an electrochemical cell: the method comprising:
  providing particles of an electrode-forming material;
  coating the particles of electrode-forming material with an inert material to form coated particles of electrode-forming material, wherein the inert material is inert with respect to the electrode-forming material; and
  mixing the coated particles of electrode forming material with a liquid or gel carrier medium to form the precursor substance.

Coating the electrode-forming particles preferably comprises encapsulating the particles of electrode-forming material to isolate the electrode-forming material from environmental reactants.

Optionally the particles of electrode-forming material are nano-particles or micro-particles, and wherein the precursor substance is a nano-emulsion or a micro-emulsion.

The inert material optionally comprises, a crystalline structure, an inorganic solid, or a ceramic material.

In one example the inert material comprises an inorganic material with a cage-like structure.

Optionally the inert material comprises a polymer with a silicon backbone.

The inert material may optionally comprise polysiloxane, polysilazanes, or other polymers comprising a silicon containing backbone.

In one example the inert material is a solid state electrolyte.

Optionally the carrier medium comprises a polar or non-polar solvent.

The carrier medium may optionally comprise water.

In one example the electrode-forming material may comprise zinc, lithium, or nickel manganese cobalt oxide or other sensitive electrode forming materials. Use of such materials ensures a high volumetric and gravimetric capacity for the anode.

Optionally the precursor substance comprises an ink for use in a printing process.

The step of coating the particles of electrode-forming material with an inert material may comprise:
  providing a solution comprising the inert material dissolved in a solvent,
  adding the particles of electrode-forming material to the solution to form a mixture, and
  coating the particles of electrode-forming material in inert material contained in the solution.

In a preferred example, the particles comprise nano-zinc particles, the inert material comprises polysilazane, and the solvent comprises Toluene.

In one example the step of coating the particles of electrode-forming material with an inert material is a sol-gel process.

Optionally substantially all of the solvent may be removed from the mixture. The coated particles of electrode-forming material typically take the form of a powder in this embodiment.

Removing the solvent from the mixture may optionally comprise evaporating the solvent, and optionally heating the mixture to facilitate evaporation of the solvent.

In one example, the step of coating the particles of electrode-forming material with an inert material comprises applying the inert material to the surface of the electrode-forming particles in a sputtering process.

Optionally the inert material is a ceramic, a crystalline solid, an inorganic solid, a crystalline inorganic solid, or a polymer.

In another aspect the present invention provides an ink for printing an electrode of an electrochemical cell, wherein the ink comprises a mixture comprising:
  a liquid or gel; and
  coated particles of an electrode forming material, wherein the coated particles of electrode-forming material are coated with an inert material which is inert with respect to the electrode-forming material.

In a further aspect the present invention provides a method of forming an electrode for an electrochemical cell, wherein the method comprises:
  providing a supply of coated particles of electrode-forming material, wherein the coated particles of electrode-forming material are coated with an inert material which is inert with respect to the electrode-forming material;
  applying a layer of the coated particles of electrode-forming material to a medium; and
  forming an electrode from the layer of coated particles of electrode-forming material.

This method of forming an electrode is particularly useful when the electrode-forming material is highly reactive, or easily oxidised. By coating the particles of electrode-forming material with an inert material, the particles can be handled in air, dispersed in a solution such as an ink, and deposited to form part of an electrochemical cell, without significant decomposition thus maintaining performance. In view of this, particles of reactive electrode-forming material coated in an inert layer can be mixed into a liquid of gel to form an ink or slurry without risk of significant decomposition as a result of reaction with the liquid or gel carrier. This increases the shelf life, stability, and deposition homogeneity of the particles.

Such an electrode is suitable for all kinds of electrochemical cells including batteries, fuel cells and supercapacitors. The method may be used to form a thin electrode layer suitable for a thin film electrochemical cell.

Optionally the step of providing a supply of coated particles of electrode-forming material comprises providing a liquid or gel, wherein the supply of coated particles of electrode-forming material are suspended within the liquid or gel, and wherein the step of applying the layer of the coated particles of electrode-forming material comprises applying the liquid or gel to the medium.

The liquid or gel may optionally comprise an ink or a slurry, and wherein applying the liquid or gel to the medium comprises using a printing process.

In one example the step of providing the liquid or gel comprises the method described above.

Optionally forming the electrode from the layer of coated particles of electrode-forming material comprises degrading the inert material.

After being incorporated in the liquid or gel, the inert coating may start to degrade. As such, it is important to apply the precursor substance to the medium before this process is too far advanced. One the precursor substance is applied to the material the continued degradation of the inert coating may be beneficial as it exposes the particles of electrode-forming material thus allowing the electrode-forming material to function as an electrode without interference or contamination from the inert material. Alternatively, where the inert coating comprises a solid electrolyte it may be desirable for the inert coating and/or the liquid or gel to be selected to be unreactive with one another to extend the life of the inert coating on the particles of electrode-forming material.

Forming the electrode from the layer of coated particles of electrode-forming material may comprise drying or curing the liquid or gel.

In one example the electrode is an anode.

Optionally the medium may be a substrate or another component of an electrochemical cell.

In a still further aspect the present invention provides an electrochemical cell prepared according to a method as described above.

In another aspect the present invention provides an article comprising an electrochemical cell as described above.

A variety of new technologies and products are made possible according to the invention. Thin cells in particular lend themselves to inclusion in articles where accessibility and space is limited or otherwise problematic. Embodiments of the invention can be used in a very wide variety of devices such as devices which are intended to be wearable (e.g. clothing, wristbands, headware, underwear, footwear, gloves), portable (e.g. suitable for use by people and animals), producible on mass scale, printable, disposable, conformable, or low power. Similarly, the invention is suited to devices requiring cost effective circuitry or which involve monitoring, logging, sensing, receiving, and data transmission. Embodiments include devices in or for, for example: mobile phones, smart cards, smart packaging, smart sensors (e.g. smart healthcare), environmental sensing devices (e.g. sensing properties of temperature, gases, humidity and other properties within containers), healthcare sensing, healthcare monitoring, and high throughput electronics devices.

Features of any one aspect or embodiment of the invention may be used, alone or in appropriate combination, with any other aspects and embodiments as may be appropriate.

BRIEF DESCRIPTION OF THE DRAWINGS

The present invention will now be described by way of non-limiting examples with reference to the following figures, in which.

DETAILED DESCRIPTION

Figure 1:
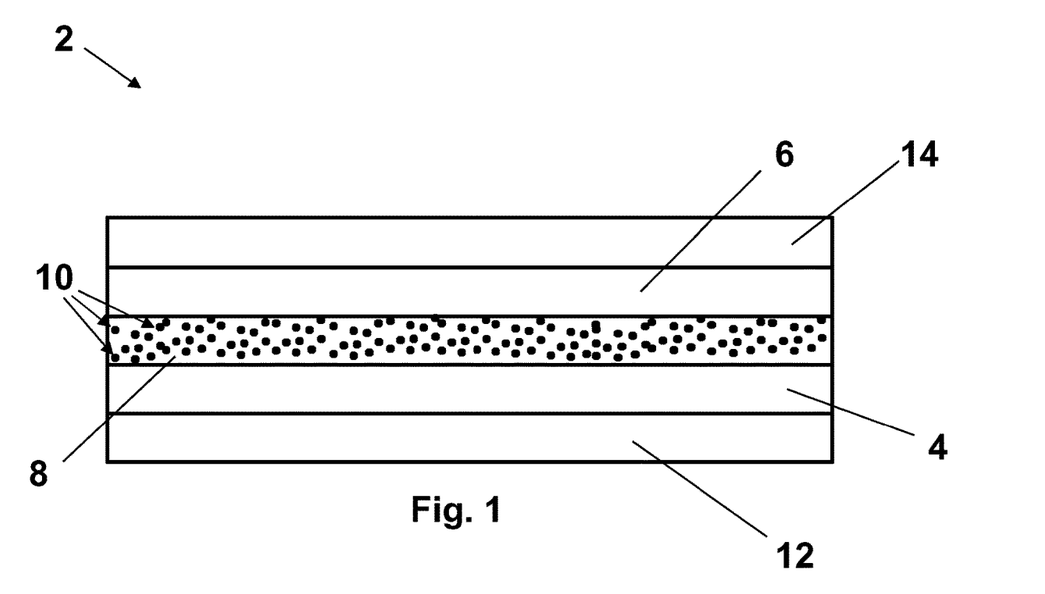
FIG. 1 is a cross-sectional schematic of an electrochemical cell.

The electrochemical cell 2 of FIG. 1 is configured to provide electrical current to an electrical device (not shown). To this end, the electrochemical cell 2 comprises a first electrode 4 in the form of an anode, i.e. a positive electrode, and a second electrode 6 in the form of a cathode, i.e. a negative electrode. To provide said electrical current, the first and second electrodes 4, 6 of the electrochemical cell 2 are couplable to an electrical device (not shown) in a conventional way.

To bring about a flow of current between the first and second electrodes 4, 6, and hence to power an electrical device (not shown) connected to the electrochemical cell 2, the electrochemical cell 2 comprises an electrolyte 10 which provides electrolytic ions capable of moving between the first and second electrodes 4, 6 to convey electrical current when the electrochemical cell 2 is connected to a circuit. The electrolyte 10 is electrochemically active with respect to both the first and second electrodes 4, 6, and is selected to react with the anode 4 to produce free electrons, and react with the cathode 6 and free electrons, thereby bringing about a flow of current between the two electrodes 4, 6.

To prevent short circuiting between the first and second electrodes 4, 6, the electrochemical cell 2 of FIG. 1 is further provided with a separator 8 that is arranged between the first and second electrodes 4, 6. As well as electrically separating the first and second electrodes 4, 6, the separator 8 acts as a structure through which the electrolytic ions may pass between the first and second electrodes 4, 6.

The electrochemical cell 2 of FIG. 1 also comprises first and second current collectors 12, 14 configured maximise current flow between the two electrodes 4, 6. To this end, the first and second current collectors 12, 14 are arranged in contact with the respective first and second electrodes 4, 6 apart from the separator 8. That is to say, the first current collector 12 is arranged directly adjacent to the first electrode 4 but away from the separator 8, while the second current collector 14 is arranged directly adjacent to the second electrode 6 but away from the separator 8, as shown in FIG. 1. In this embodiment, the first and second current collectors 12, 14 are couplable to an electrical device (not shown) instead of the electrodes 4, 6.

The electrochemical cell 2 of FIG. 1 is a thin film electrochemical cell 2. In other words, the electrochemical cell 2 has a thickness of between about 20 and 1000 microns. To achieve such a thin film, the separator 8, the electrodes 4, 6, and the current collectors 12, 14 all take the form of thin film layers.

Although this disclosure relates to an anode 4 for a thin film electrochemical cell 2 such as the one shown in FIG. 1, and in particular to a method of forming of such an anode, the skilled person will appreciate that the described method is equally well-suited for forming all types of electrodes 4, 6 for use in all types of electrochemical cells including batteries, fuel cells and supercapacitors. The skilled person will appreciate such electrochemical cells may or may not include a separator layer 8 or current collectors 12, 14, for example.

Figure 2:
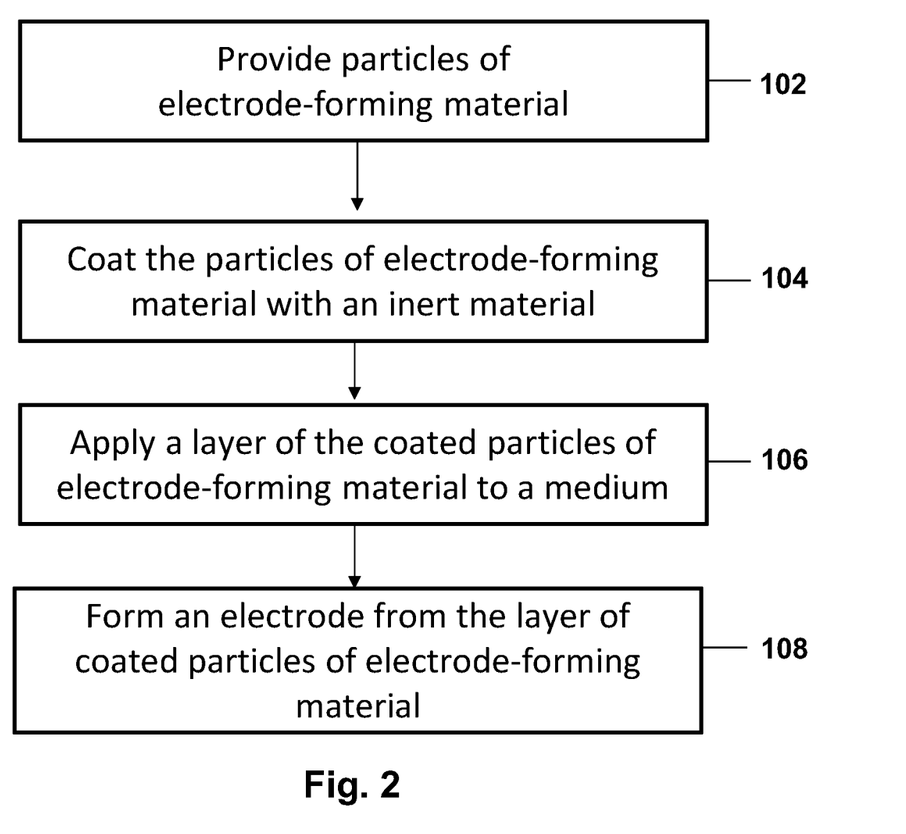
FIG. 2 is a flow chart indicating the steps of a method for forming an electrode for an electrochemical cell in accordance with an aspect of the invention.

The method of this disclosure for forming an electrode 4, 6 for an electrochemical cell 2 is depicted in FIG. 2.

Figure 3:
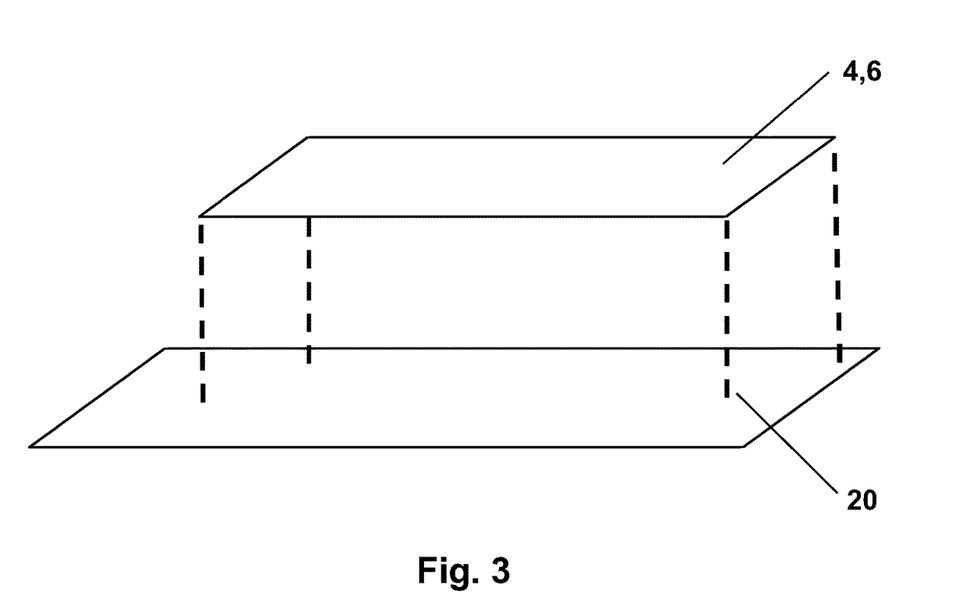
FIG. 3 is an exploded view of an electrode formed on a substrate in accordance with the method of FIG. 2.
Figure 4:
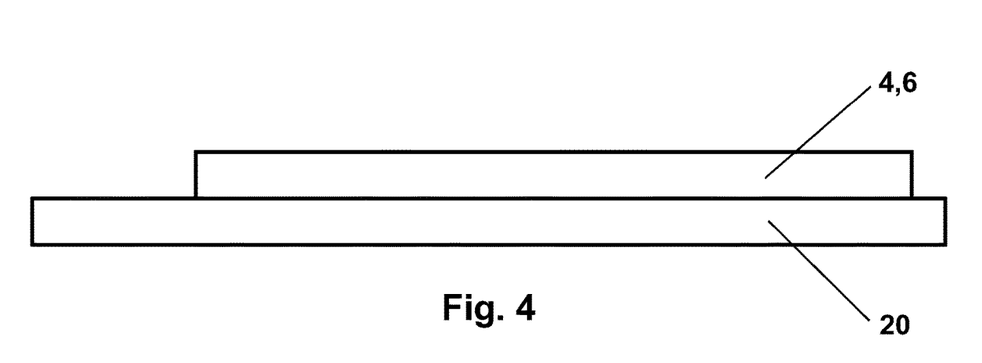
FIG. 4 is a cross-sectional view of the electrode of FIG. 3.

In a first step 102, particles of electrode-forming material are provided. Thereafter, in a second step 104, the particles of electrode-forming material are coated with an inert material—that is, a material that is inert with respect to electrode-forming material. In doing so, coated particles of electrode-forming material are formed. In the next step 106, a layer of the coated particles of electrode-forming material are applied to a medium 20 such as a substrate. In the fourth and final step 108, an electrode 4, 6 is formed out of the layer of coated particles of electrode-forming material on the medium 20, as depicted in both FIGS. 3 and 4.

This method of forming an electrode 4, 6 for an electrochemical cell 2 is particularly well-suited for electrode-forming materials that are highly reactive and/or easily oxidised in ambient conditions. By coating said particles of electrode-forming material with an inert material, such particles are passivated and can be handled and used as part of an electrode forming process with significantly reduced risk of degradation by oxidation or other undesirable reactions. As a result, this facilitates a high throughput and highly efficient production process for electrodes 4, 6.

Each of steps 102 to 108 of the method for forming an electrode 4, 6 for an electrochemical cell 2 will now be described successively.

The first step 102 will be described first.

As stated above, in step 102 of the method, particles of electrode-forming material are provided. Since the electrode-forming material will eventually form the structure of the electrode 4, 6, the electrode-forming material may comprise any suitable material for forming the desired electrode 4, 6, Preferably, the particles of the electrode-forming material are micro- or nano-sized, i.e. less than 1000 microns.

As stated above, the method of this disclosure is particularly well-suited for forming electrodes 4, 6 from materials that are highly reactive or easily oxidisable. For example, the electrode-forming material may comprise reactive metal particles such as lithium or zinc particles or even silicon, sodium or magnesium particles. The skilled person appreciates that the method is particularly suitable for forming positive electrodes 4, i.e. anode, where such reactive metals are often used, but that it could likewise be used for negative electrodes 6, i.e. cathodes. Pure metals are generally preferred for electrodes 4, 6 as they can be used to ensure a high volumetric and gravimetric capacity.

An overview of the second step 104 of the method for forming an electrode 4, 6 of FIG. 2 is outlined below.

In the second step 104, the particles of electrode-forming material are coated with an inert material.

As discussed above, this step is carried out to protect the particles of electrode-forming material and to prevent them from being oxidised and damaged as the electrode 4, 6 is being formed. To this end, the inert material may be an inorganic material that has a cage-like structure, i.e. a structure that can entirely surround, i.e. encapsulated, and hence safely protect, individual particles of the electrode-forming material. In one example, the inert material comprises a polymer with a silicone backbone such as a polysiloxane (e.g. polydimethylsiloxane) or a polysilazane. Alternatively, the inert material may comprise a solid conductor, a crystalline structure, a crystalline solid, an inorganic solid, or a ceramic.

Figure 5:
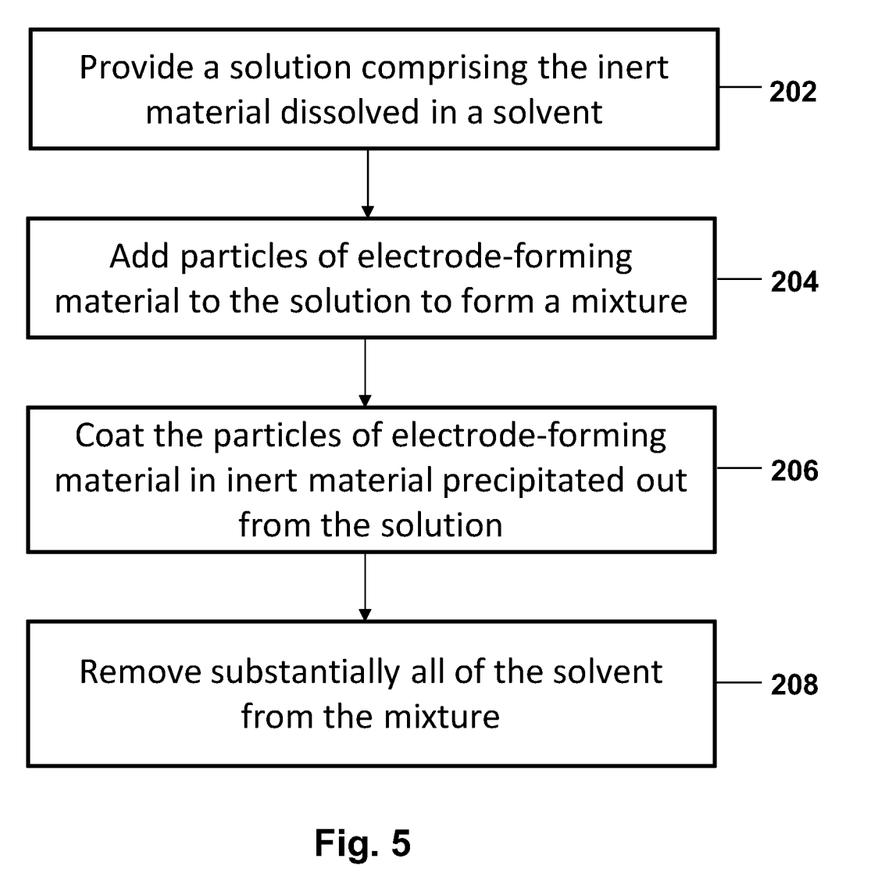
FIG. 5 is a flow chart indicating the steps of a method of coating particles of electrode-forming material with an inert material as part of the method of FIG. 2.

The inert material may comprise a solid state electrolyte that can provide a diffusion pathway for electrolytic ions, when the electrode 4, 6 is used as part of an electrochemical cell 2. As such, the performance of the Solid Electrolyte Interphase (SEI) layer may be improved. Ordinarily batteries form an even SEI layer (or passivation layer) which is usually aided with 'formation cycling' for lithium ion batteries. A solid electrolyte coating reduces the need for careful implementation/growth as a good SEI layer will form even without extensive battery conditioning An example method for coating the particles of electrode-forming material is a sol-gel process as depicted in FIG. 5 as described below.

In a first step 202, a solution is provided containing a solvent (e.g. Toluene) and an inert material (e.g. a polysiloxane) which is dissolved or dispersed in said solvent. The skilled person will appreciate that such a solution may be formed by dissolving the inert material in the solvent. In the next step 204 the particles of electrode-forming material are added to the solution to form a mixture that takes the form of a microemulsion. In the following step 206, the inert material coats the particles of electrode-forming material. This occurs due to the fact that the coating arrangement represents the lowest energy state for the inert material. In the final step 208, all, or almost all, of the solvent is removed from the mixture. The removal of the solvent can be done, for example, by heating the mixture and evaporating the solvent. This typically yields discrete coated particles of electrode-forming material in the advantageous and easy to handle form of a powder.

The skilled person appreciates that many other solvents and inert materials may be used for such a process, for example polymeric LiPON in Toluene (or THF and other non-polar solvents), or dispersions of ceramics in a liquid.

In an alternative example, the particles of electrode-forming substance could be sputter coated with the inert material using well known and conventional sputtering techniques. Sputter coating is particularly suitable when the inert material is a specific crystalline material such as perovskites which require a specific structure. The skilled person appreciates that other suitable techniques for coating the particles of the electrode-forming material are available.

An overview of the third step 106 of the method for forming an electrode 4, 6, as depicted in FIG. 2, is given below.

In the third step 106, a layer of the coated particles of electrode-forming material is applied to a medium 20 such a substrate.

To this end, the coated particles of electrode-forming material are incorporated into a liquid or gel to form a precursor substance, which itself is then applied to the medium 20. For example, the precursor substance may take the form of an ink or slurry that is printable on the medium 20.

Figure 6:
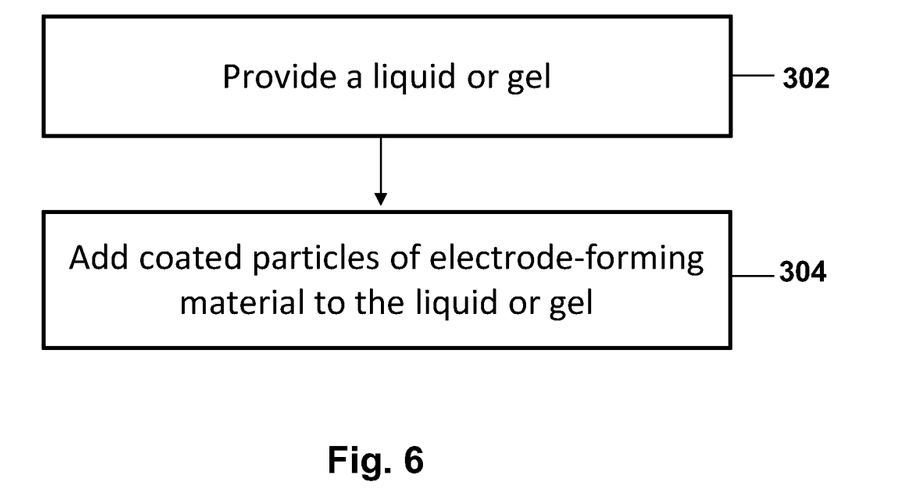
FIG. 6 is a flow chart indicating the steps of a method of forming a fluid for application to the medium as part of the method of FIG. 2.

To form the precursor substance, the method depicted in FIG. 6 may be used. In the first step 302 of this process, a liquid or gel is provided. Thereafter, in the second step 304, the coated particles of electrode-forming material are added to the liquid or gel and mixed to form the precursor substance.

Water may be used as the liquid phase of the precursor substance. The use of water as the liquid phase is particularly desirable when the inert material is reactive with water such that the inert coating may be degraded by the water over time as described below.

The precursor substance is applied to the medium 20 using a suitable process such as a printing process. This may include screen-printing, stencilling, flexography, gravure, and off-set and ink-jet printing. Preferably, a bar coater is used to print the fluid. Such printing processes are advantageous since they allow thin layers of the precursor substance to be applied to the medium 20 and hence thin film electrodes 4, 6 to be formed. Moreover, they allow electrodes 4, 6 to be formed both cheaply and efficiently.

As mentioned above, depending on the inert material and liquid or gel used to form the precursor substance, the inert material coating on the particles of the electrode-forming material may begin to degrade once the coated particles of electrode-forming material are mixed with the liquid or gel. An example of this is polysiloxane coated particles mixed in water or electrolyte.

In most cases where the inert coating is degraded by the carrier liquid or gel, it is important to apply the precursor substance to the medium 20 before this process is too far advanced.

One the precursor substance is applied to the medium 20 the continued degradation of the inert coating may be beneficial as it exposes the particles of electrode-forming material thus allowing the electrode-forming material to function as an electrode without interference or contamination from the inert material.

Alternatively, where the inert coating comprises a solid electrolyte it may be desirable for the inert coating and/or the liquid or gel to be selected to be unreactive with one another to extend the life of the inert coating on the particles of electrode-forming material. For example, when the precursor substance is an ink or slurry, the presence of the inert material coating can improve shelf life and stability and can improve the deposition homogeneity of the particles (by allowing dispersion more easily and hence preventing the ink from settling out and clumps forming).

The medium 20 onto which the precursor substance is applied during manufacture of the electrode may comprise another component of the electrochemical cell 2 (such as a current collector or a separator for example). This other component may itself have been formed by a printing process and may include electronic circuits. In this way, compete electrochemical cells 2 can be formed using a printing process.

An overview of the fourth step 108 of the method for forming an electrode 4, 6 depicted in FIG. 2 is given below.

In the fourth step 108, an electrode 4, 6 is formed from the layer of coated particles of electrode-forming material deposited on the medium 20.

When a layer of precursor substance is applied to a medium 20, the layer may be dried as part of the fourth step 108. For example, using a heater or a laser. In doing so, the liquid or gel in the precursor substance may be evaporated such that the coated particles of electrode-forming material remain on the medium 20.

In cases where the inert material coating degrades when in contact with the liquid or gel phase of the precursor substance, it may be desirable not to fully dry the layer of deposited electrode-forming particles so that a portion of the liquid or gel phase of the precursor substance remains in the layer so that the inert coating continues to degrade after the particles of electrode-forming material have been deposited. In this way, in the completed electrode substantially all of the inert coating material may be degraded. In an alternative example, substantially all of the inert coating by have degraded before the precursor substance is applied to the medium 20. In this example, the coated particles of electrode-forming material may be added to the gel or liquid phase to form the precursor substance at a set time before the precursor substance is applied to the medium 20. If the half-life of the degradation of the inert material in the liquid or gel is known, an appropriate time between mixing of the precursor substance and application to the medium 20 can be determined.

Figure 7:
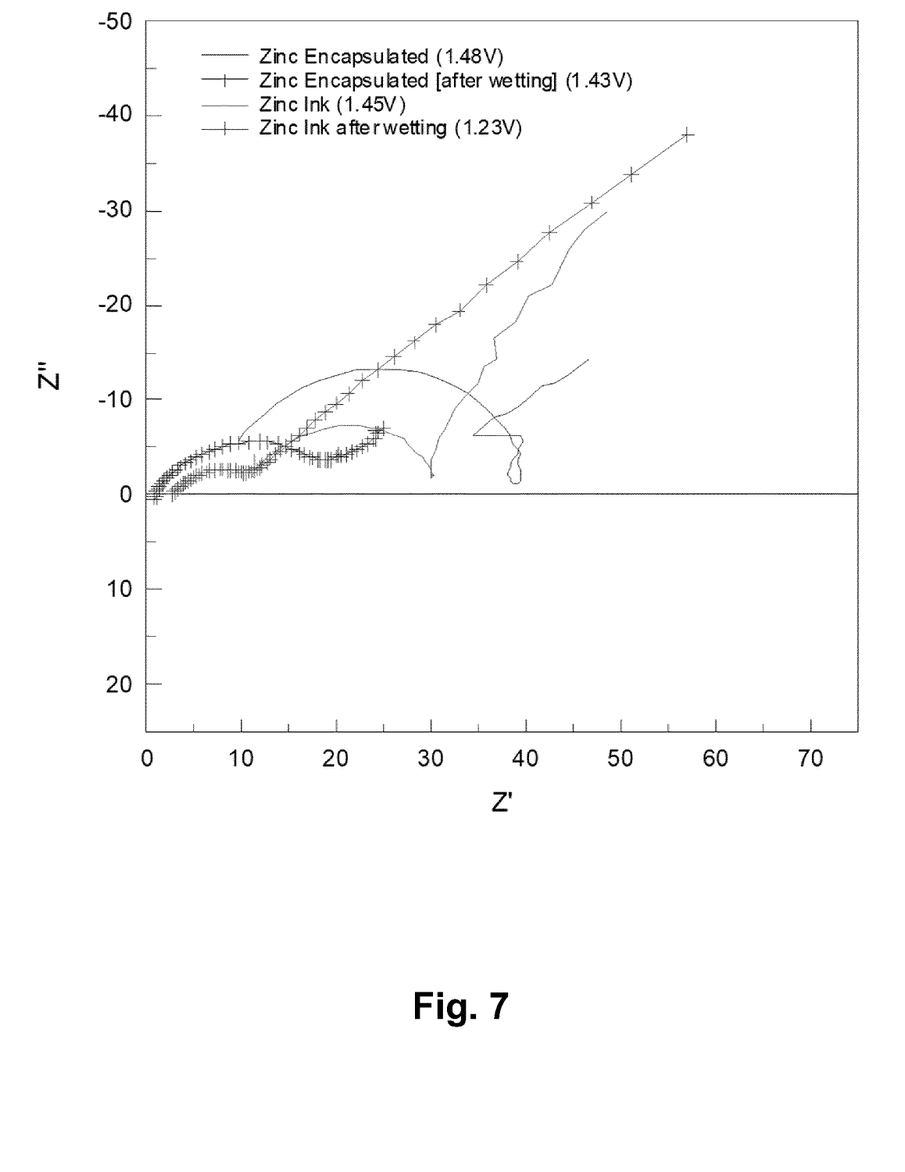
FIG. 7 shows an Electrochemical Impedance Spectroscopy (EIS) plot for an example electrochemical cell.

In view of above descriptions of the steps of the method of the disclosure, the skilled person will appreciate that steps 102 and 104 relate to a (sub-)process of forming coated particles of an electrode-forming material, while steps 106 and 108 relate to a (sub-)process of forming an electrode 4, 6 using coated particles of electrode-forming material. FIG. 7 shows an EIS chart for a 25 µA discharge of 2 cm 2 electrochemical cell with a $MnO_2$ cathode and 6Mol KOH solution electrolyte.

Two anode precursor substances were tested. One comprising zinc particles encapsulated in a polydimethylsiloxane (PDMS) coating mixed with water and applied to a nickel foil current collector then wetted overnight (16 hours) with 6Mol KOH solution. The other comprising uncoated zinc particles mixed with water and applied to a current collector and wetted overnight (16 hours) with 6Mol KOH solution.

The EIS plot before and after wetting, shows higher resistivity for the encapsulated particles before wetting because the resistance of the PDMS polymer is higher. However, after wetting for the resistance of the encapsulated zinc is lower. The zinc ink is thought to form a resistive ZnO layer, whilst the encapsulated particles do not. The lower resistance of the encapsulated particles after wetting suggests that the formation of a ZnO layer is suppressed, reducing the energy lost in discharge due to a lower ohmic resistance of a flowing current in the electrode.

Figure 8:
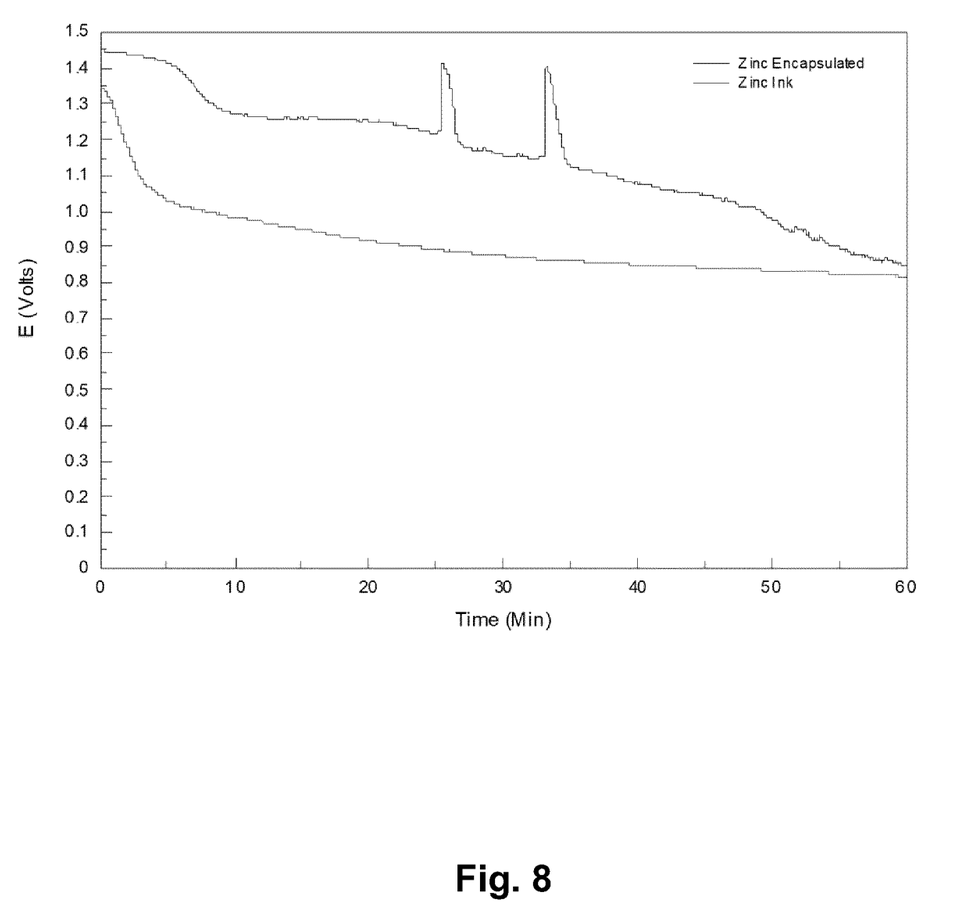
FIG. 8 shows voltage drop over time for the example cell.

FIG. 8 shows voltage drop over time for an example electrochemical cell having the same make up as that described above in relation to FIG. 7. The plot shows a smaller voltage drop at the start of discharge for the encapsulated particles, suggesting that the energy loss due to ohmic resistances is less. As the cell is discharged, electrons must travel from the surface of the electrode in contact with the electrolyte to the current collector, through the thickness of the electrode. If the surface of the electrode particles are coated in a resistive layer, the electrons lose energy travelling through the thickness of these layers, which leads to less available energy for useful work. The encapsulated particles are thought to have a lower thickness of resistive ZnO by reducing the oxidation of the zinc in the ink.

Many variations of the invention are possible without departing from the spirit and scope of the invention as set out in the claims which follow.

The invention claimed is:

1. A method of forming a precursor substance for forming an electrode of an electrochemical cell, the method comprising:
    providing particles of an electrode-forming material;
    coating the particles of electrode-forming material with an inert material to form coated particles of electrode-forming material, wherein the inert material is inert with respect to the electrode-forming material, and wherein coating the particles of electrode-forming material with an inert material comprises applying the inert material to a surface of the electrode-forming particles in a sputtering process; and
    mixing the coated particles of electrode forming material with a liquid or gel carrier medium to form the precursor substance.

2. The method as claimed in claim 1, wherein the particles of electrode-forming material are nano-particles or micro-particles.

3. The method as claimed in claim 1, wherein the inert material comprises, a crystalline structure, or an inorganic solid.

4. The method as claimed in claim 1, wherein the inert material comprises an inorganic material with a structure that can encapsulate individual particles of the electrode forming material.

5. The method as claimed in claim 1, wherein the inert material comprises a polymer with a silicon backbone.

6. The method as claimed in claim 5, wherein the inert material comprises polysiloxane, or polysilazanes.

7. The method as claimed in claim 1, wherein the inert material is a solid state electrolyte.

8. The method as claimed in claim 1, wherein the carrier medium comprises a polar or non-polar solvent.

9. The method as claimed in claim 1, wherein the carrier medium comprises water.

10. The method as claimed in claim 1, wherein the electrode-forming material comprises zinc, lithium, or nickel manganese cobalt oxide.

11. The method as claimed in claim 1, wherein the precursor substance comprises an ink for use in a printing process.

12. An ink for printing an electrode of an electrochemical cell, wherein the ink comprises a mixture comprising:
    a liquid or gel; and
    coated particles of an electrode forming material, wherein the coated particles of electrode-forming material are coated by a sputtering process with an inert material which is inert with respect to the electrode-forming material.

13. A method of forming an electrode for an electrochemical cell, wherein the method comprises:
    providing a supply of coated particles of electrode-forming material, wherein the coated particles of electrode-forming material are coated by a sputtering process with an inert material which is inert with respect to the electrode-forming material;
    applying a layer of the coated particles of electrode-forming material to a medium; and
    forming an electrode from the layer of coated particles of electrode-forming material.

14. The method as claimed in claim 13 wherein the step of providing a supply of coated particles of electrode-forming material comprises providing a liquid or gel, wherein the supply of coated particles of electrode-forming material are suspended within the liquid or gel, and wherein the step of applying the layer of the coated particles of electrode-forming material comprises applying the liquid or gel to the medium.

* * * * *